[11] 3,571,583

| [72] | Inventors | Henry M. Halpern<br>Cherry Hill, N.J.;<br>Jack J. Rudnick, Bala Cynwood, Pa. |
|---|---|---|
| [21] | Appl. No. | 763,862 |
| [22] | Filed | Sept. 30, 1968 |
| [45] | Patented | Mar. 23, 1971 |
| [73] | Assignee | The United States of America as represented by the Department of the Navy |

[54] MULTICHANNEL
7 Claims, 1 Drawing Fig.

[52] U.S. Cl. ................................................ 235/181,
324/77, 340/174.1, 350/151
[51] Int. Cl. .................................................. G06g 7/19,
G01r 23/18
[50] Field of Search........................................... 235/181;
350/151; 324/77; 340/174.1

[56] References Cited
UNITED STATES PATENTS

| 3,224,333 | 12/1965 | Kolk et al. ..................... | 350/151 |
| 3,229,273 | 1/1966 | Baaba et al. ................... | 350/151X |
| 3,268,879 | 8/1966 | Lins............................... | 340/174.1 |
| 3,281,777 | 10/1966 | Cholet........................... | 235/181X |
| 3,284,785 | 11/1966 | Kornei.......................... | 340/174.1 |
| 3,358,149 | 12/1967 | Preikschat..................... | 235/181X |
| 3,441,724 | 4/1969 | Taylor........................... | 235/181 |
| 3,486,016 | 12/1969 | Faiss.............................. | 235/181 |

OTHER REFERENCES

Cutrona et al. Data processing by eptical techniques 1959 Conference proceedings 3rd National convention on military electronics June 29-July 1, 1959 pages 23— 26

*Primary Examiner*—Malcolm A. Morrison
*Assistant Examiner*—Felix D. Gruber
*Attorneys*—E. J. Brower, Arthur L. Branning and T. O. Watson, Jr.

ABSTRACT: This invention is directed to a multichannel optical cross-correlation analyzer. The analyzer utilizes two functions on recording media whose directions of motion are perpendicular to each other. One of the functions is recorded on a Kerr magneto-optic surface. A beam of light is first modulated by one of the functions and then is modulated by the other of the functions. The modulated beam is then integrated by a photodiode array and the electrical output of the diodes recorded. The analyzer implements the integral;

$$g(y) = \frac{1}{x}\int_0^x f_1(x, y) f_2(x) dx$$

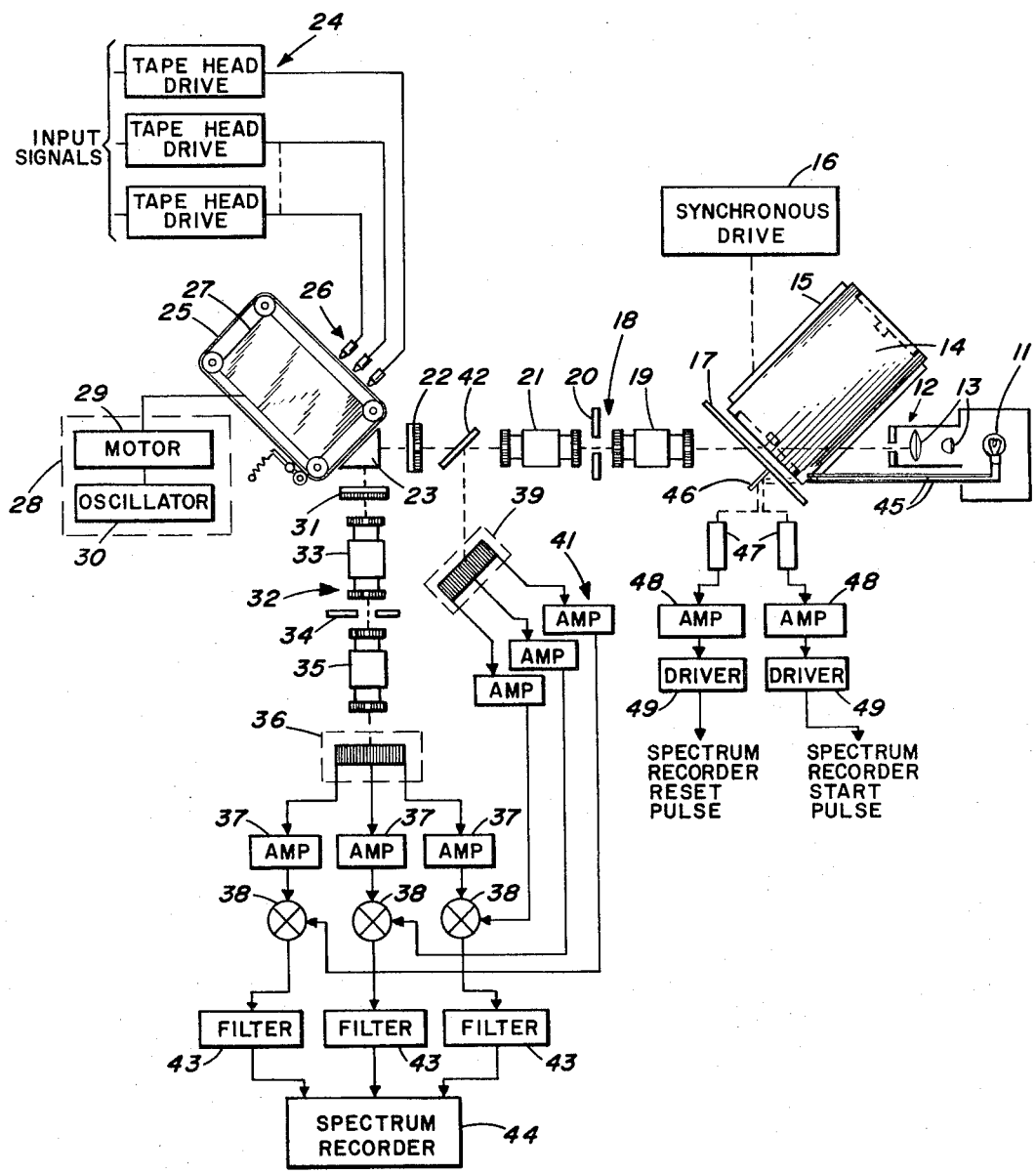

MULTICHANNEL

STATEMENT OF GOVERNMENT INTEREST

The invention defined herein may be manufactured and used by or for the Government of the United States of America for governmental purposes without the payment of any royalties thereon or therefor.

BACKGROUND OF THE INVENTION

1. Field of the Invention

The invention is related to the field of optical information processing. More particularly, this invention is directed to a multichannel optical cross-correlation analyzer which utilizes the Kerr magneto-optic effect. Among the functions performed by the inventive analyzer are classification, correlation and spectrum analysis of electrical signals.

2. Description of the Prior Art

Analyzers using the optical cross-correlation techniques are known in the prior art. These devices, however, are not suitable for comparing a large number of references with a varying input signal. They provide no simple way, for example, of achieving the continuous scan of frequencies required in electrical spectrum analysis. The resolution of these systems is limited. Furthermore, when an accurate comparison of an input signal with a reference signal is required, the prior art analyzers relied on photograph film or similar expendable recording media to record the input signal.

SUMMARY OF THE INVENTION

The present invention represents a substantial advance over the prior art. The system components carrying the two signals being compared are driven at right angles to each other. This results in a substantial saving in reference function length and facilitates the comparison of a large number of references with a varying input signal. Furthermore, the system utilizes the Kerr magneto-optic effect to provide a reusable recording media for the input signal. The Kerr surface is stationary and therefore does not give rise to noise which is present when a moving surface is utilized.

The inventive analyzer correlates as compares a reference function with an input signal recorded on a Kerr magneto-optic surface. The reference function is recorded on a transparent endless belt hereinafter referred to as the reference belt whose direction of motion is perpendicular to the motion of the magnetic tape which records the input signal on the Kerr magneto-optic surface. A light source is provided adjacent to the reference function. The light from this source is modulated by the reference function and is imaged onto the Kerr surface. The Kerr surface further modulates the light and reflects it onto an array of photodiodes which integrate the light signal and convert it to an electrical signal. The electrical signal is then recorded.

The analyzer thus is seen to implement the integral $$g(y) = \frac{1}{x} \int_0^x f_1(x, y) f_2(x) dx$$

where:

$f_1(x,y)$ is imposed in the light beam by the reference function;

$f_2(x)$ is imposed on the light beam by the Kerr surface; and $1/x$ is a normalizing factor It is an object of this invention to provide a new and improved optical cross-correlation analyzer.

It is a further object of this invention to provide an optical cross-correlation analyzer which results in a substantial saving in function length.

It is a still further object of this invention to provide an optical cross-correlation analyzer wherein the functions utilized are driven at right angles to each other.

Yet another object of this invention is to provide an optical cross-correlation analyzer wherein one of the functions utilized is recorded on a reusable medium.

A still further object of this invention is to provide an optical cross correlation analyzer which utilizes a Kerr magneto-optic surface.

BRIEF DESCRIPTION OF THE DRAWINGS

Other objects. advantages and attendant features of this invention will become readily apparent from the specification and drawing wherein the figure sets forth the inventive analyzer.

DESCRIPTION OF PREFERRED EMBODIMENT

Referring to the drawing, the analyzer utilizes a xenon light source 11 mounted in casing 12. The light is condensed by lens system 13 and focused by a field stop mounted on casing 12. The light from the source is projected through a transparent belt 14 which is recorded markings indicative of the reference function to be compared with the signal being analyzed, the tape being held off the surface of support 15 by an air bearing system. The reference belt and casing are at a 45° angle to the optical axis. Reference belt 14 is usually made from photographic film or similar transparent media and is driven across support 15 by a synchronous drive system 16. The air bearings enable the tape to be driven at high speeds.

The light from source 11 is modulated by the reference belt 14 is then passed through an aperture in mask 17 and focused by a telecentric optic system 18 comprising first telecentric lens 19, field stop 20 and second telecentric lens 21. The telecentric optic system gives 1:1 imagining of the light received from the aperture in mask 17.

The light after passing through telecentric lens 21 is then passed through a plane polarizer 22 placed on the optical axis where it is imaged onto a Kerr magneto-optic surface. The Kerr surface is a thin film of iron cobalt (FeCo) and is deposited on the rear surface of a prism 23. This surface is a good reflector of light and has excellent magnetic switching properties.

The Kerr surface is located at 45° angle to the optical axis in order to provide a surface having a magnetic field in the direction of the Poynting vector of the impinging propogation of light, thereby obtaining the maximum outward flow of energy from the Kerr surface.

At this point it may be helpful to describe what the Kerr magneto-optic effect is and how it operates. In 1888 Kerr discovered that plane polarized light becomes elliptically polarized when reflected from the poles of a magnet. This effect is named after its discoverer, and is usually called the magneto-optic Kerr effect to distinguish it from the more familiar electro-optic effect.

The Kerr magneto-optic effect is closely related to the Faraday effect which deals with the rotation of the plane of polarization of an electromagnetic wave when propagating through a region where a magnetic field exists in the direction of propagation. Since light is an electromagnetic disturbance, the Faraday effect is also applicable to light. The Kerr effect differs in that it deals with reflected light. However, the two phenomena are closely related, and an analysis of the Kerr effect can be made on the basis of Faraday rotation in the surface region that the light penetrates in the process of being reflected.

The input signals for the system are impressed on the Kerr surface by signals recorded on a magnetic tape. The input signals are received at 24 and recorded on a magnetic tape 25 in a plurality of channels by tape recording heads 26. There may be a plurality of recording heads, depending upon the number of input signals to be analyzed, but for the sake of simplicity only three are shown here. The tape 25 forms an endless belt and is driven by a capstan system 27. The capstan drive system comprises a motor 29 and oscillator 30.

The light beam from the Kerr surface is then reflected to a second polarizer 31 and a second telecentric lens system comprising first telecentric lens 33, field stop 34 and second telecentric lens 35.

The light beam passed by the telecentric lens is converted to a plurality of electric signals by a photodiode array 36. The electric signals are amplified in many channels by amplifier 37 and is fed to differential amplifier 38 where it is combined with a noise signal. The noise signal is derived from photodiode array 39 and amplifier 41 which receives light deflected by partial mirror 42.

The outputs of differential amplifiers 38 are passed to filters 43 and then recorded to give a visible output.

Recorder 44 start and reset signals are received from light source 11 through pipes 45 from reference belt 14, reflector 46 and detectors 47. The light signal from source 11 is converted to electricity by detectors 47 enhanced by amplifiers 48 and passed to drivers 49. These drivers are operative to start and reset recorder 44.

OPERATION

The inventive analyzer implements the integral $$g(y) = \int_0^x f_1(x, y) f_2(x) dx$$

This integral defines the cross-correlation of two functions $f(x)$ and $f(y)$. While a variety of operations can be performed by the analyzer, its operation, for purposes of description, will be described in terms of spectrum analysis wherein $f_1(x,y) = \cos(w_x x)$ $y = kt$ and $k$ is a constant $t =$ time coordinate, and $w_x =$ spatial frequency along the $x$ direction in reference belt 14 and varies as a linear function of the reference belt translation $y$ so that $w_x = (wy)$.

$w_x$ is constant across the width of the aperture in mask 17. The variables associated with $(x)$ and $(y)$ of the equation is selected by the operation to be performed. The functions $f_1(s)$ and $f_2(x,y)$ may be signals or prerecorded references. $\cos w_y(t)$ is implemented by means of the reference belt 14 which is translated in a direction normal to the direction.

In spectrum analysis, the input to the system is a random sinusoidal signal having a recurring frequency characteristic which is to be detected. The frequency of the recurring characteristic is within a predetermined bandwidth. The input at the Kerr magneto-optic surface is compared with all the frequencies in this bandwidth by means of the reference belt, and the resulting output of the system recorded. The bandwidth can be changed by varying the relative speed of the tape and the reference belts. When used for spectrum analysis, the speed of input 25 is either 15 or 0.3 inches per second while the speed of the reference belt 14 is 725 inches per second. The large difference in speed between the input and the reference belt is necessary because the input signal recorded on the Kerr surface is constantly changing.

In operation, $\cos(w_x x)$ is prerecorded on the reference belt. The direction of motion of the belt is perpendicular to the direction of motion of magnetic tape 25. For a high resolution system such as is provided, the signal recorded on the Kerr surface must be compared with all the frequencies $w_x$ in a given bandwidth. In order to make this comparison, a reference $\cos w_x$ is provided for each frequency. If these references were introduced into the aperture in mask 17 along the direction of motion of magnetic tape 25, the length of the function would be so long as to make any comparison impractical. The direction of motion of the belt 14 was therefore made perpendicular to the direction of motion of tape 25. The perpendicular relationship between the reference belt 14 and the tape 25 means that each reference must be recorded along the width of the reference belt 14 in a substantially side by side relationship. This reduces the function length by the ratio of the reference length to the reference width. For example, if each reference has a length of 2 inches and a width of one thirty-second of an inch then the total reference function length would be reduced to one sixty-fourth of that which would be necessary in a parallel driven system. This resulted in a substantial saving in function length and facilitates the comparison of a large number of references in a very short period of time.

The reference belt is designed so that it changes the frequency in the direction of motion, but at any point $y$ the reference frequency is always constant across the width of the aperture. Since phase is a function of time, the reference belt may also be designed to scan phase as well as frequency.

The light signal as modulated by the reference signal is then projected onto the Kerr surface by the 1:1 telecentric optic system 21 and polarizer 22. The telecentric imaging results in a point by point comparison of the reference with the input signals $f_2(x)$ recorded on the Kerr surface.

The input signals which are received at input 24 are first recorded in the conventional longitudinal manner, on magnetic tape in a plurality of channels by recording heads 26. The Kerr surface which is deposited in a thin film on prism has good magnetic properties and as the tape moves past the Kerr surface, the input signals are transferred to it.

The thin film which is a good optical reflector is mounted at a 45° angle to the optical axis so that a component of the magnetic field set up on the surface by tape 25 will be in the direction of the light waves. In accordance with the Kerr magneto-optic effect the plane polarized light received from 22 is elliptically polarized when reflected. The light is thus further modulated by the Kerr surface.

The Kerr magneto-optic effect on the light is small. The input signals are therefore hard clipped and maximum signals are used at all times in the analyzation.

The modulation of the light at this stage is completed by a polarizer 31. The optical axis of this polarizer is orthogonal to the axis of the polarizer 22. The light transmitted through polarizer 31 is a function of the polarization rotation induced by the Kerr surface.

The light emerging from polarizer 31 represents the function $f_2(x) \cos(w_x x)$ for each channel of the Kerr surface. This light signal is then imaged onto a photodiode array 36 by a second telecentric optic system.

Each photodiode array 36 is actually comprised of a plurality of photodiode networks. A separate photodiode network is positioned to receive the light reflected from each channel of the Kerr surface.

Each photodiode network integrates the signals reflected from its respective channel on the Kerr surface and passes them to amplifiers 37 where the integrated signals are amplified. The signals are then subtracted at a differential amplifier 38 from the signals derived from photodiode array 39.

Photodiode array 39 is identical to and arranged in the same manner as photodiode array 36. A photodiode network is positioned to receive from partial mirror 42 a reflection of the light imaged onto each channel of the Kerr surface. The signal received by each photodiode 41 is fed to the differential amplifier 38 which receives a corresponding signal in order to subtract the effects of imperfections and average fluctuations in the reference function from the resultant output.

The actual functions recorded on the reference belt and the Kerr surface are recorded about a bias. The filter 43 filters out the extraneous components of the signal resulting from the bias recording and the output of the filter represents the integral implemented by the analyzer. This is then recorded at 44.

Operation of recorder 44 is controlled by the reference belt 14. Light from source 11 is imaged onto the belt by a pair of light pipes 45. A mark at the start of the reference function on the reference belt modulates the beam emitting from one of the light pipes. The modulated signal is reflected to one of light detectors 47 where it is converted to an electrical signal, amplified at 48 and fed to a driver 49 to initiate operation of the recorder. Similarly, a mark is placed on the reference belt at the end of function and modulates the beam emitting from the second pipe. This in turn is reflected, detected and passed to driver 49 to reset the recorder.

Thus it is seen that an improved multichannel optical analyzer, which facilitates the comparison of a substantial number of functions and provides high resolution and accuracy, has been provided.

Other modifications and variations of the described embodiment will be apparent to those skilled in the art. Accordingly, it is understood that the described embodiment of the present invention is presented by way of example and such modifications, changes or variations as are embraced by the spirit and scope of the appended claims are contemplated as within the purview of the present invention.

We claim:

1. An optical cross-correlation analyzer comprising:
   a source of light producing a beam about an optical axis;
   reference means comprised of a reference function recorded on a transparent endless belt; said reference means mounted at a first angle to said optical axis and operative to modulate said beam of light;
   means for moving said reference means at a predetermined rate;
   input signal means comprised of a moving magnetic recorded tape and a stationary surface adjacent said tape whereby the input signal is impressed on the stationary surface; said input signal means mounted at a second angle to said optical axis and operative to further modulate said beam of light;
   means for moving said magnetic recorded tape at a predetermined rate;
   photoelectric means for receiving and converting the modulated light from said input signals means to an electric signal; and
   means for amplifying and recording the output of said photoelectric means.

2. An optical cross-correlation analyzer as in claim 1 wherein; the orientation of said first angle with respect to said second angle is such that the motion of the reference means in perpendicular to the input signal.

3. An optical cross-correlation analyzer as in claim 2 wherein; said stationary surface is comprised of a thin film Kerr magneto-optic material, said Kerr magneto-optic surface operative to further modulate said light beam.

4. An optical cross-correlation analyzer as in claim 3 wherein; said magnetic recording tape contains a plurality of channels for providing a plurality of input signals.

4. An optical cross-correlation analyzer as in claim 3 wherein; said magnetic recording tape contains a plurality of channels for providing a plurality of input signals.

5. An optical cross-correlation analyzer as in claim 4 wherein; said photoelectric means is comprised of a plurality of separate photoelectric means corresponding to each channel of said magnetic recording tape.

6. An optical cross-correlation analyzer as in claim 5 wherein said amplifying means includes;
   sampling means, mounted on the optical axis between said reference means and said signal input means, comprised of a partial mirror and photoelectric means for converting said sample to an electrical signal;
   differential amplifying means connected to each of said separate photoelectric means and to said sampling means whereby imperfections and average fluctuations produced by said reference means are subtracted from the output of said separate photoelectric means.

7. An optical cross-correlation analyzer as in claim 6 wherein said Kerr magneto-optic surface comprises a thin film of FeCo as a coating on a prism.